United States Patent
Jaeger et al.

(10) Patent No.: US 7,624,505 B2
(45) Date of Patent: Dec. 1, 2009

(54) DEBURRING BY HOBBING WITH INTEGRATED SECONDARY DEBURRING WITHOUT A SMOOTHING TOOL

(75) Inventors: Helmut F. Jaeger, Koenigsbach-Stein (DE); Juergen Peschina, Knittlingen (DE)

(73) Assignee: Felsomat GmbH & Co. KG, Koenigsbach-Stein (DE)

( * ) Notice: Subject to any disclaimer, the term of this patent is extended or adjusted under 35 U.S.C. 154(b) by 0 days.

(21) Appl. No.: 12/311,156

(22) PCT Filed: Jul. 20, 2007

(86) PCT No.: PCT/DE2007/001297

§ 371 (c)(1),
(2), (4) Date: Mar. 18, 2009

(87) PCT Pub. No.: WO2008/034402

PCT Pub. Date: Mar. 27, 2008

(65) Prior Publication Data

US 2009/0238654 A1    Sep. 24, 2009

(30) Foreign Application Priority Data

Sep. 20, 2006    (DE) .................. 10 2006 044 738

(51) Int. Cl.
  B23F 17/00    (2006.01)
  B23F 23/08    (2006.01)

(52) U.S. Cl. ............... 29/893.35; 29/38 R; 29/38 A; 29/564; 409/6; 409/8; 409/40; 409/49; 409/51

(58) Field of Classification Search ............... 409/6, 409/8, 26, 37, 38, 40, 42, 49, 51, 55, 54, 409/58, 60, 61, 62; 29/893, 893.3, 893.35, 29/893.36, 38 A, 38 B, 38 R, 563, 37 R, 564, 29/35.5, 56.5

See application file for complete search history.

(56) References Cited

U.S. PATENT DOCUMENTS 1,786,697 A * 12/1930 Bullock et al. ............... 409/53

(Continued)

FOREIGN PATENT DOCUMENTS

DE    84 08 486.3 U1    6/1984

(Continued)

OTHER PUBLICATIONS

Reishauer Maschine RZ 150.

(Continued)

*Primary Examiner*—Erica E Cadugan
(74) *Attorney, Agent, or Firm*—Walter A. Hackler (57) ABSTRACT

The invention relates to a method for tooth-machining of workpieces (3), especially gear wheels, comprising milling, deburring by hobbing and integrated secondary deburring. The method proceeds on a machine tool (1) having two workpiece spindles (11, 12) which may exchange places. A workpiece (3) is mounted on a first workpiece spindle (11), followed by the workpiece spindles (11, 12) exchanging places, followed by pre-milling and, where applicable, cutting (=deburring by shaving) of the workpiece (3), followed by a further exchange of places, followed by chamfering and cutting of the workpiece (3), followed by a further exchange of places, followed by a finish-milling of the workpiece (3), followed by a further exchange of places, followed by a workpiece change. At the same time, the same procedure takes place on the second workpiece spindle (12), staggered in time by an exchange of places of the workpiece spindles (11, 12). With the method according to the invention, well-deburred toothed workpieces (3) may be produced quickly and at low cost.

9 Claims, 4 Drawing Sheets

U.S. PATENT DOCUMENTS

| | | | | |
|---|---|---|---|---|
| 1,990,240 | A | * | 2/1935 | Miller .......................... 409/34 |
| 2,032,646 | A | * | 3/1936 | Adams ......................... 409/21 |
| 2,048,173 | A | * | 7/1936 | Adams et al. ................. 409/16 |
| 2,107,543 | A | | 2/1938 | Miller |
| 2,585,271 | A | * | 2/1952 | Praeg ........................... 409/6 |
| 2,585,272 | A | * | 2/1952 | Praeg ........................... 409/6 |
| 2,628,537 | A | * | 2/1953 | Miller .......................... 409/35 |
| 3,267,811 | A | * | 8/1966 | Hediger ........................ 409/8 |
| 6,565,418 | B1 | * | 5/2003 | Feisel .......................... 451/10 |
| 2002/0197121 | A1 | * | 12/2002 | Mall ............................. 409/9 |
| 2003/0210964 | A1 | * | 11/2003 | Fitzgerald et al. ............ 409/11 |
| 2009/0175696 | A1 | * | 7/2009 | Jaeger ......................... 409/31 |

FOREIGN PATENT DOCUMENTS

| | | |
|---|---|---|
| DE | 198 57 592 A1 | 6/2000 |
| DE | 199 18 289 A1 | 10/2000 |

OTHER PUBLICATIONS

Liebherr Wälzfräsmachine LC 120/Liebherr Hobbing Machine LC 120.

Gleason-Hurth "Wälzentgratwerkzeuge".

* cited by examiner

DEBURRING BY HOBBING WITH INTEGRATED SECONDARY DEBURRING WITHOUT A SMOOTHING TOOL

The invention relates to a method for operating a machine tool for tooth-machining of workpieces, wherein the machine tool has a rotary holder which is rotatable about a main axis HA and which has two workpiece spindles whose spindle axes extend parallel to the main axis HA, especially wherein the spindle axes are each at the same distance from the main axis HA, wherein the rotary holder is rotatable into a first rotated position in which the first workpiece spindle is in a transfer position and the second workpiece spindle is in a machining position, and wherein the rotary holder is rotatable into a second rotated position in which the first workpiece spindle is in the machining position and the second workpiece spindle is in the transfer position.

An operating method of that kind and an associated machine tool are known by way of the "RZ 150" of the company Reishauer AG.

Toothed workpieces, especially gear wheels, are needed in engineering for numerous applications. Gear wheels are typically manufactured from a metal blank by milling on hobbing machines. To ensure a long service life of gear wheels, the edges of the gear wheels must be free of so-called burrs. Burrs are projecting pieces of material produced on a gear wheel during milling of the gear wheel, especially in the region close to edges.

It is known to pass a so-called end mill along the edges on every tooth of a gear wheel following milling and in that manner to perform deburring. That procedure is very time-consuming and laborious, however.

By way of the company publication entitled "Wälzentgratwerkzeuge" of the company Gleason-Hurth, Munich, March 2001, a deburring operation comprising the following procedure has become known: first, milling of the gear wheel is performed. At the same time or subsequently, the projections of material, which extend away from the teeth in the axial direction of the gear wheel, are shaved off. That shaving operation will be referred to hereinafter as "cutting" (in the prior art, that operation on its own is also referred to as deburring). Then, the gear wheel is transferred to another machine and chamfered, i.e. at least some of the edges of the teeth are plastically deformed, and thereby bevelled, by a plane chamfering tool applied at an inclined angle, producing beads of material projecting radially and axially. The axial projections are removed by cutting. The radial projections are removed by smoothing, i.e. a smoothing tool is applied to the gear wheel in the radial direction and plastically deforms the radial projection and presses it flat. A disadvantage with that method is the amount of time taken for all the steps of the method. In particular, the milling operation and the chamfering operation each require their own clamping operation and synchronisation of the workpiece with the respective tool.

A quicker procedure has become known by way of the Liebherr LC 120 hobbing machine, cf. company publication "Sigma Aktuell 05", p. 6, 2005: using a special milling cutter, first of all normal milling of the gear wheel and, where applicable, cutting takes place. Then, a first and a second chamfer milling operation take place in succession using respective special portions of the special milling cutter, producing a left and a right chamfer by milling, i.e. by removing material. Then, post-milling of the teeth using a further portion of the special milling cutter takes place. By means of the special milling cutter it is possible for carefully deburred gear wheels to be produced without retooling. The chamfer milling does, however, prolong the machining time on the milling machine. Furthermore, the special milling cutter is expensive and is difficult to re-grind. Re-grinding requires dismantling of the special milling cutter.

By contrast, the object of the present invention is to provide a method whereby well-deburred toothed workpieces may be produced quickly and at low cost.

SUMMARY OF THE INVENTION

That object is attained by an operating method of the kind mentioned in the introduction, characterised by the following steps:

a) the rotary holder is brought into the first rotated position, at the first workpiece spindle, in the transfer position, a finished part is unloaded and an unmachined part is loaded, and at the second workpiece spindle, in the machining position, a semi-finished part is produced from an unmachined part by pre-milling;

b) the rotary holder is brought into the second rotated position, at the first workpiece spindle, in the machining position, a semi-finished part is produced from the unmachined part by pre-milling, and at the second workpiece spindle, in the transfer position, a deburred chamfered semi-finished part is produced from the semi-finished part by chamfering and cutting;

c) the rotary holder is brought into the first rotated position, at the first workpiece spindle, in the transfer position, a deburred chamfered semi-finished part is produced from the semi-finished part by chamfering and cutting, and at the second workpiece spindle, in the machining position, a finished part is produced from the deburred chamfered semi-finished part by fine-milling;

d) the rotary holder is brought into the second rotated position, at the first workpiece spindle, in the machining position, a finished part is produced from the deburred chamfered semi-finished part by fine-milling, and at the second workpiece spindle, in the transfer position, the finished part is unloaded and an unmachined part is loaded;

wherein steps a) to d) are repeated at least once.

Within the context of the invention, the following terms are used as follows:

deburring refers in general to the removal of projections of material from the workpiece.

cutting refers specifically to the shaving off of projections of material extending away from the workpiece in the axial direction. Shaving is typically done with the sharp edge of a cutting tool.

Using the operating method according to the invention, tooth-machining of a workpiece including deburring is performed, comprising pre-milling (usually supplemented by cutting), chamfering with cutting edges, and fine-milling (=finish-milling). In that method, the workpiece is clamped to a workpiece spindle only once, at the start of machining.

Pre-milling and fine-milling take place in a machining position of the workpiece spindle, and chamfering with cutting edges takes place in a transfer position of the workpiece spindle. At the transfer position, workpiece changing furthermore takes place before the start of machining and after the end of machining.

As a result of the workpiece being clamped only once for milling and deburring, a great deal of mounting work and time is saved in comparison with the prior art according to Gleason-Hurth. Apart from the clamping time itself, re-synchronisation of a workpiece spindle and a chamfering tool for deburring is also omitted. In particular, a separate deburring machine for the chamfering operation is also unnecessary within the scope of the invention. Owing to the fine-milling, in which only a small quantity of material is removed and therefore no burr is produced, the invention is also able to dispense with final smoothing. According to the invention, therefore, there is also no necessity for a smoothing tool.

Compared with the prior art according to Liebherr, an expensive and high-maintenance special milling cutter is dispensed with. In addition, chamfering with cutting edges and workpiece changing may be carried out synchronously with pre-milling and finish-milling. In other words: with the invention it is possible to save completely on the time taken for the chamfer-milling operation in the case of Liebherr.

The non-productive time of the milling tool at the machining position may essentially be reduced within the scope of the invention to the time taken for rotation of the rotary holder. An excellent capacity utilisation of the milling tool is thereby achieved.

Altogether, inexpensive, very fast and high-quality tooth-machining of a workpiece with deburring may be performed with the invention.

Special preference is given to a variant of the method according to the invention in which the main axis HA of the rotary holder is oriented horizontally during method steps a) to d). This prevents accumulations of swarf. Chips of material, especially hot metal chips, may simply fall down away from workpiece and workpiece spindle and thus no longer interfere with the machining procedure. As an alternative, the main axis may also be oriented vertically, which reduces bearing forces.

In a preferred variant of the method, the same tool of the machine tool is used for the pre-milling of unmachined parts and for the fine-milling of deburred chamfered semi-finished parts at the machining position. In that manner, the structure of the machine tool may be simplified and the machine tool may be made cheaper. The tool (milling tool) achieves a good utilisation capacity.

Special preference is also given to a variant of the method which provides that, in steps b) and c), the chamfering of a semi-finished part at the transfer position is performed from two sides with force equalisation. In that manner, forces applied to the workpiece and the workpiece spindle holding the workpiece are reduced, whereby in turn deformation is avoided. The two sides are typically opposite relative to the bearing of the workpiece.

A preferred further development of that variant of the method provides that, in steps b) and c), two opposing chamfering discs are used for chamfering a semi-finished part at the transfer position. The chamfering discs may in that case machine both side faces of the workpiece simultaneously. The chamfering discs may be advanced well to the workpiece by means of arms and may be guided well in a "floating" manner with force equalisation.

In an advantageous continuation of that development, it is provided that cutting tools are integrated in the chamfering discs, and the chamfering discs are used for chamfering and cutting. Integration of the tools means in this case that a chamfering tool and a cutting tool may be moved and used together, especially wherein chamfering tool and cutting tool have a common holder, for example a movable arm. Owing to the integration, the structure of the machine tool may be simplified, especially in respect of the number of parts that are to be moved.

In an alternative variant of the method according to the invention, in steps b) and c) the chamfering and the cutting of a semi-finished part at the transfer position are each performed with separate tools. Separate tools may be acquired at little cost and are easy to maintain.

In another, advantageous variant of the method, in steps b) and c) the chamfering of a semi-finished part at the transfer position is performed from a first side and the cutting of the semi-finished part at the transfer position is performed from a second side which is opposite the first side, with separate, opposing tools. That procedure makes it possible to obtain an at least partial equalisation of force, which protects workpiece and bearing.

A most especially preferred variant of the method provides that, in steps a) and b), during or after pre-milling of an unmachined part at the machining position, cutting is also performed. The additional cutting operation removes the axial projection of material, produced by the pre-milling, before the chamfering operation takes place. The chamfering operation then takes place at a better defined edge, and the material redistributed during chamfering is reduced. The latter reduces the size of the deformation bead after the chamfering operation.

Further advantages of the invention will be apparent from the description and the drawings. Equally, according to the invention the features mentioned above and the features set forth hereinafter may be used individually or a plurality thereof may be used in any desired combination. The embodiments shown and described are not to be understood as forming a definitive list, but rather are of the nature of examples for illustrating the invention.

BRIEF DESCRIPTION OF THE DRAWINGS

The invention is illustrated in the drawings and will be described in detail with reference to illustrative embodiments. In the drawings.

DETAILED DESCRIPTION

Figure 1:
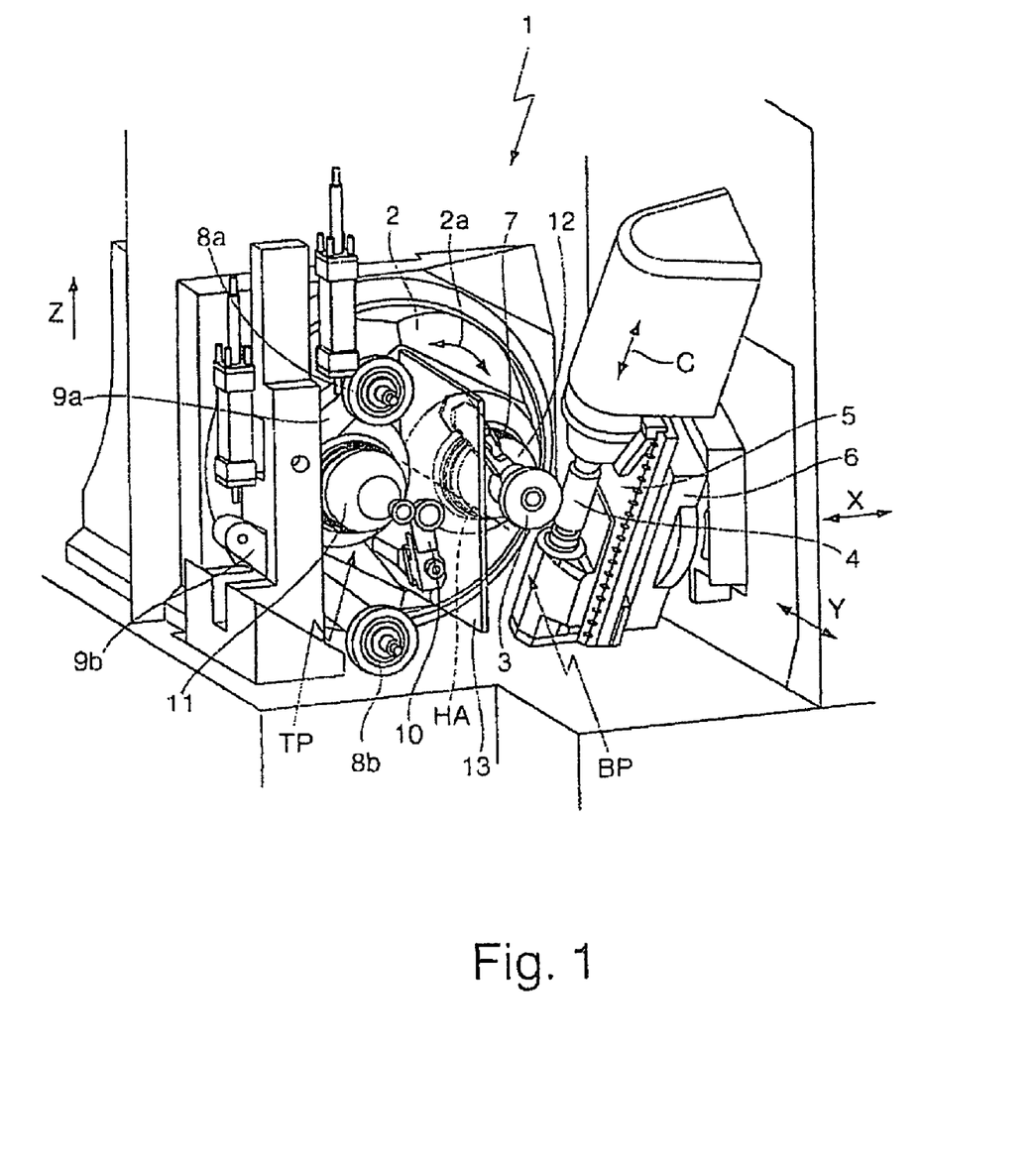
FIG. 1 shows a schematic oblique view of a machine tool with which the operating method according to invention may be carried out.

FIG. 1 shows a machine tool 1 with which the operating method according to the invention may be used.

The machine tool 1 has a rotary holder 2 which is in the form of a drum and which is rotatable by a motor about a horizontally extending main axis HA in the direction of the arrow 2a. Disposed on the rotary holder 2 are a first workpiece spindle 11 and a second workpiece spindle 12. A respective workpiece may be clamped to each of the workpiece spindles 11, 12, for example by means of a chuck, and may be set in rotation by a motor. The axes of rotation of the workpiece spindles 11, 12 extend parallel to the main axis HA and are at the same distance from it. In the state shown, a workpiece 3 is fastened only to the second workpiece spindle 12. A transparent shield 13 is arranged between the workpiece spindles 11, 12 in order to prevent chips from flying between the workpiece spindles 11, 12.

The rotary holder 2 is situated in FIG. 1 in a first rotated position. In that position, the first workpiece spindle 11 is in a transfer position TP on the left-hand side, and the second workpiece spindle 12 is situated at a machining position BP on the right-hand side of the machine tool 1.

By rotation of the rotary holder 2, however, the first workpiece spindle 11 may be moved to the right to the machining position BP, and the second workpiece spindle 12 may be moved to the left to the transfer position TP; that would correspond to a second rotated position (not shown in FIG. 1). The rotary holder 2 may be equipped with a mechanical stop for each of the two rotated positions.

The workpiece 3 on the (in this case second) workpiece spindle 12 in the machining position BP is accessible to a milling tool 4. The milling tool 4 is fastened to a holder 5. The holder 5 may be moved relative to a slide 6 in the direction C. The slide 6 is in turn movable relative to the machine bed of the machine tool 1 in the directions x and y. The milling tool 4 itself is rotatable by a motor about its longitudinal axis (this extends parallel to the direction of the arrow C). In addition to the milling tool 4, there is also provided at the machining position BP a first cutting tool 7 with which the workpiece 3 on the (in this case second) workpiece spindle 12 may also be machined.

In the illustrated embodiment of the machine tool 1, two chamfering discs 8a, 8b are provided at the transfer position TP, each of which is fastened to a respective pivoting arm 9a, 9b. By means of the pivoting arms 9a, 9b the chamfering discs 8a, 8b may be moved in a plane perpendicular to the main axis HA, especially towards and away from the axis of rotation of the (in this case first) workpiece spindle 11 at the transfer position TP. In addition, a second cutting tool 10 is provided, with which workpieces on the (in this case first) workpiece spindle 11 may be machined at the transfer position TP. The transfer position TP also includes a device for changing workpieces on the (in this case first) workpiece spindle 11 at the transfer position TP, for example a robot arm (not shown). The device for changing workpieces may be integrated in or separate from the machine tool 1.

Figure 2:
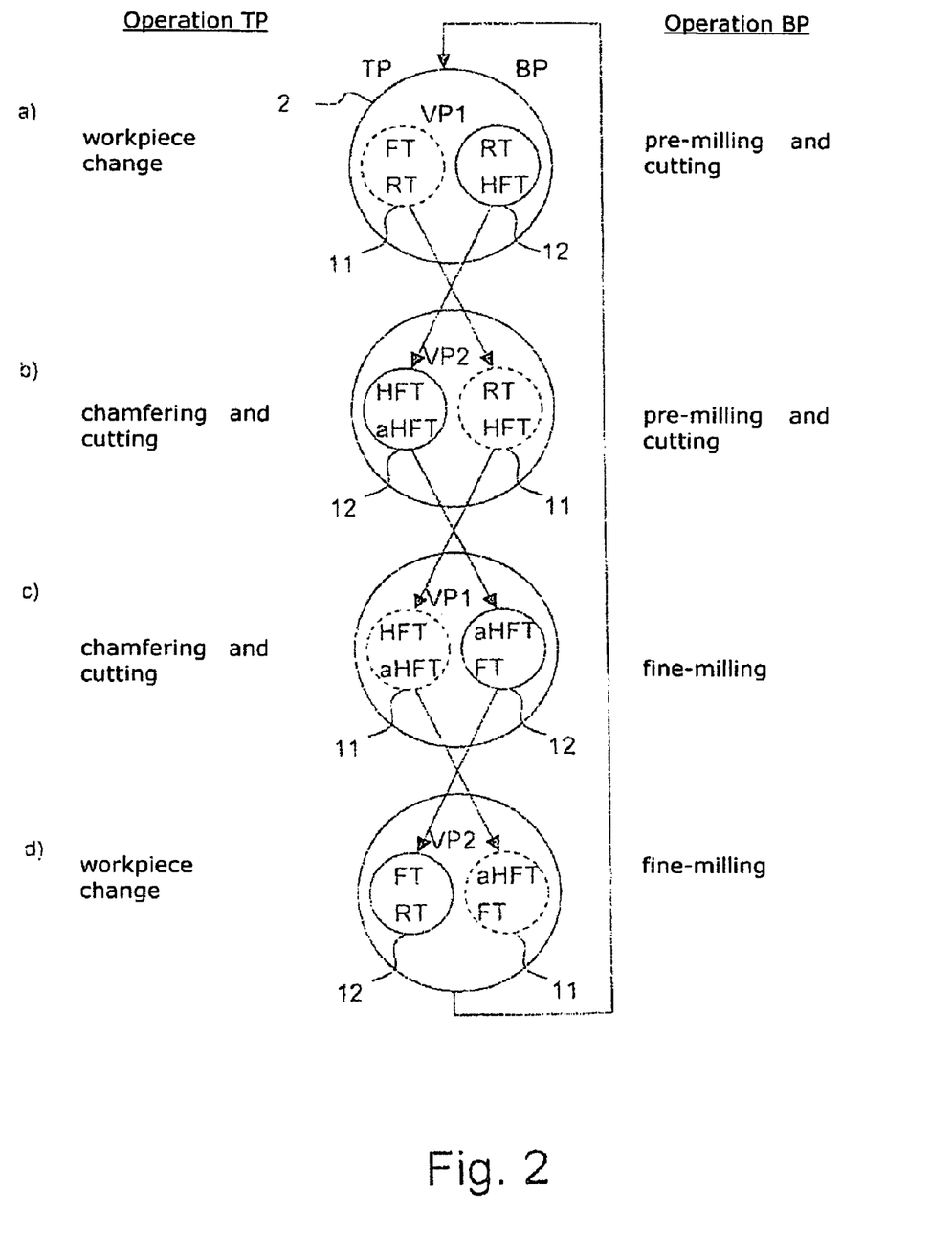
FIG. 2 is a schematic flow diagram of the method according to the invention at the workpiece spindles on the rotary holder.

FIG. 2 explains the sequence of the workpiece machining operation on the two workpiece spindles 11, 12 on the rotary holder 2.

At the start of the method, cf. row a), the rotary holder 2 is brought into a first rotated position VP1. The first workpiece spindle 11 is then situated on the left at the transfer position TP. The first workpiece spindle 11 is identified in the following by a dashed-line circle. At this point, a finished part FT is situated on the first workpiece spindle 11. The second workpiece spindle 12, identified by a continuous circle, is situated on the right at the machining position BP. An unmachined part RT is clamped to the second workpiece spindle 12.

In the course of the first step a), at the transfer position TP the finished part FT is unclamped from the first workpiece spindle 11 and replaced by an unmachined part RT from an unmachined parts store. At the machining position BP, the unmachined part RT is pre-milled by the milling tool. In the variant illustrated, the workpiece on the second workpiece spindle 12 is also subjected, simultaneously or immediately subsequently, to a cutting operation, i.e. the axial projections of material (burrs) are removed. A semi-finished part HFT is thus produced from the unmachined part RT.

At the start of the following step b), the rotary holder 2 is rotated to the second rotated position VP2. On the first workpiece spindle 11, the unmachined part RT is then subjected to pre-milling and cutting at the machining position BP, producing from the unmachined part RT a semi-finished part HFT. On the second workpiece spindle 12, chamfering and, simultaneously or subsequently, cutting are performed on the semi-finished part HFT, producing a chamfered and (in the course of cutting) deburred semi-finished part aHFT.

At the start of the third step c), which then follows, the rotary holder 2 is brought into the first rotated position VP1 again. On the first workpiece spindle 11, in the transfer position TP, a deburred chamfered semi-finished part (aHFT) is made from the semi-finished part HFT by chamfering and cutting. On the second workpiece spindle 12, in the machining position BP, a finished part FT is produced from the deburred chamfered semi-finished part aHFT by fine-milling (also referred to as finish-milling).

In the following step d), first the rotary holder 2 is turned to the second rotated position VP2. On the first workpiece spindle 11, at the machining position BP, the deburred chamfered semi-finished part aHFT becomes, by fine-milling, a finished part FT. On the second workpiece spindle 12, in the transfer position TP, the finished part FT is removed and a new unmachined part RT is clamped in position.

The method may then continue with step a), which starts with the rotary holder 2 being brought into the first rotated position VP1.

To begin the method according to the invention for the first time, in a first preliminary step d'), first of all in the second rotated position VP2 of the rotary holder 2, a new unmachined part RT is clamped to only the empty second workpiece spindle 12 in the transfer position TP. In the second preliminary step a') which follows, after rotation into the first rotated position VP1 only a new unmachined part RT is clamped to the first workpiece spindle 1 in the transfer position TP. On the second workpiece spindle 12, however, pre-milling and cutting may already be begun on the unmachined part RT situated there. To end the method according to the invention, it is merely necessary to dispense with the clamping-on of new unmachined parts RT.

The time frame for pre-milling and cutting of an unmachined part RT on a workpiece spindle at the machining position BP is, for example, 10 s (s=seconds). For fine-milling on a workpiece spindle of the machining position BP, 5 s, for example, are required. Rotation of the rotary holder 2 requires, for example, 2 s. A workpiece change at a workpiece spindle in the transfer position TP typically and preferably requires less time than the fine-milling operation; equally, chamfering and cutting on a workpiece spindle in the transfer position TP typically and preferably requires less time than the fine-milling operation. In a complete pass through steps a) to d), therefore, the time for pre-milling (20 s) occurs twice and the time for fine-milling (10 s) occurs twice and, in addition, there are four rotations of the rotary holder (8 s). Accordingly, two finished parts FT are produced in a total of 38 s. On account of the workpiece changing operation and the deburring (i.e. chamfering and cutting) operation being carried out in parallel with the milling operation, their times are not included in the total production time if those steps at the transfer position TP are shorter than the duration of the fine-milling operation. It is therefore possible according to the invention to achieve a very rapid and efficient production of parts.

FIGS. 3a to 3f illustrate the progress of machining a workpiece on a workpiece spindle over the course of the method according to the invention as shown in FIG. 2. Each Figure shows a workpiece 3, from which a gear wheel is being made, in cross-section in a plane extending through the axis of rotation 31 of the workpiece 3.

Figure 3A:
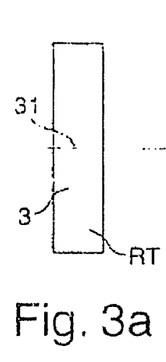
FIGS. 3a-3f are illustrations of the machining state of a workpiece during the method according to the invention, the workpiece being illustrated in schematic cross-section.
Figure 3B:
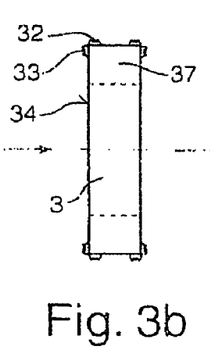
Figure 3C:
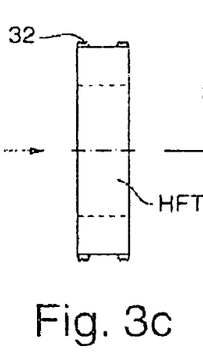
Figure 3D:
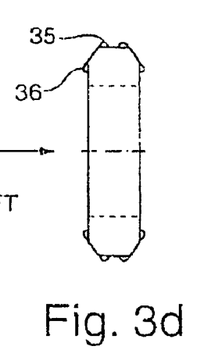

The unmachined part RT illustrated in FIG. 3a is essentially a circular metal disc. By pre-milling, teeth 37 are ground and gaps between the teeth are milled at the edge of the workpiece 3. This produces both projections 32 of material in the radial direction (in short: radial burrs 32) and projections 33 of material in the axial direction (in short: axial burrs 33), cf. FIG. 3b. Those burrs 32, 33 on the one hand pose a risk of injury and on the other hand are a source of defects in gear mechanisms and should therefore be removed.

The axial burrs 33 are removed according to the invention by cutting after pre-milling. In that operation, a (typically straight) cutting edge is applied to and passed along the side faces 34 of the workpiece 3, thereby shaving off the axial burrs 33. That cutting is also referred to in the prior art as "deburring". After pre-milling and cutting (within the scope of the invention the cutting operation is optional at this point), a semi-finished part HFT is obtained, cf. FIG. 3c.

Figure 3E:
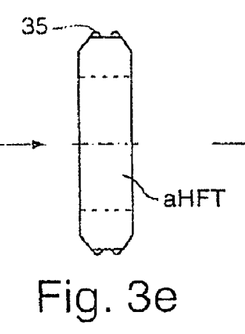

To remove the radial burs 32, according to the invention the chamfering operation then takes place. In that operation, a flat chamfering tool is pressed with a high force against the edges of the semi-finished part, so that the edges undergo plastic deformation. In the process, material is pressed outward away from the edges, and beads 35 of material projecting in the radial direction and beads 36 of material projecting in the axial direction are produced, cf. FIG. 3d. The axial beads 36 of material are removed by cutting; that cutting operation is also referred to as secondary deburring. Cutting takes place in this case after chamfering; alternatively, chamfering and cutting may also take place simultaneously. The state of the workpiece 3 after the cutting operation, that is, the chamfered semi-finished part aHFT which has been deburred in the course of the latter cutting operation, is shown in FIG. 3e.

The remaining radial beads 35 of material are then removed by fine-milling (also referred to as finish-milling). In that operation, a little more material is milled off the workpiece 3, which, however, owing to the small quantity of material and hence the low degree of material stress, does not lead to burrs. The workpiece 3 after the fine-milling operation, that is, the finished part FT, is shown in FIG. 3f.

Figure 3F:
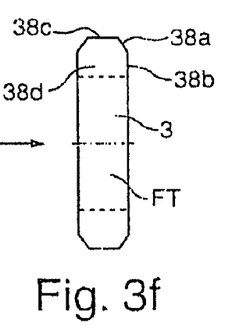
Figure 3G:
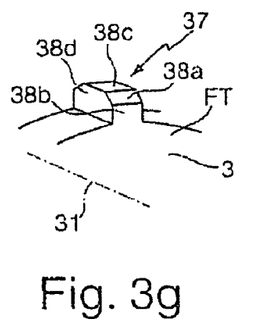
FIG. 3g shows a detail taken from a schematic oblique view of the finished part of FIG. 3f.

To amplify the foregoing description, FIG. 3g shows a detail of the finished part FT of FIG. 3f, more specifically the region of an individual tooth 37 of the workpiece 3, in a perspective oblique view. The chamfered edge 38a, which is situated between side face 38b and upper face 38c of the tooth 37, can be seen clearly. Within the scope of the invention it is also possible for other edges of the tooth 37, especially the edges between side face 38b and inside 38d of the tooth 37, to be chamfered and deburred as an alternative or in addition. Within the scope of the invention it is also possible in principle for tooth types other than the illustrated tooth 37 to be produced, especially those with tooth faces that are inclined to the axial and/or radial direction.

Figure 4A:
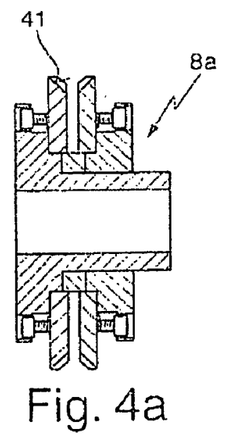
FIG. 4a shows a schematic cross-section of a chamfering disc that may be used in the method according to the invention.

FIG. 4a shows the chamfering disc 8a of FIG. 1 in a schematic cross-section in the yz plane of FIG. 1. Formed on the chamfering disc 8a are flat chamfering tools 41 which are pressed onto an edge of the workpiece. The workpiece lies between two adjacent chamfering tools 41 and may in that manner be chamfered (not shown) at the upper side and the lower side simultaneously. The spacing of the chamfering tools 41 may be varied to adapt to various types of workpiece and/or to apply force.

Figure 4B:
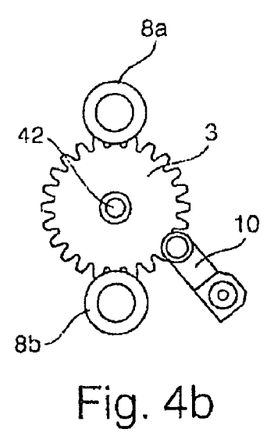
FIG. 4b shows a schematic plan view of a workpiece during chamfering with cutting edges, wherein two opposing chamfering discs and a separate cutting tool are used.

FIG. 4b illustrates a first variant for chamfering and cutting a workpiece 3 disposed on a workpiece spindle at the transfer position, shown in plan view onto the workpiece 3. The workpiece 3 is fastened to the workpiece spindle by a chuck 42. Two chamfering discs 8a, 8b lie opposite each other relative to the chuck 42 (or the workpiece axis). The chamfering discs are pressed against the workpiece with the same force, so that the workpiece 3 does not experience any moment relative to its bearing. In addition, a cutting tool 10 performs cutting on the workpiece 3. The machine tool of FIG. 1 is equipped for that variant.

Figure 4C:
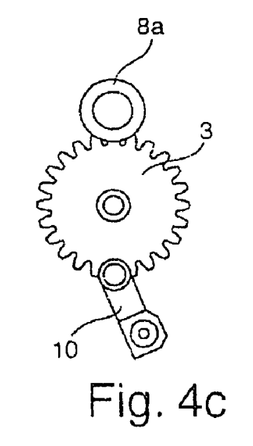
FIG. 4c shows a schematic plan view of a workpiece during chamfering with cutting edges, wherein one chamfering disc and a separate, opposing cutting tool are used.

FIG. 4c shows a second variant for chamfering and cutting on the workpiece 3. A single chamfering disc 8a is disposed in this case opposite a cutting tool 10. The cutting tool 10 partially compensates for the moment applied to the workpiece 3 by the chamfering disc 8a.

Figure 5A:
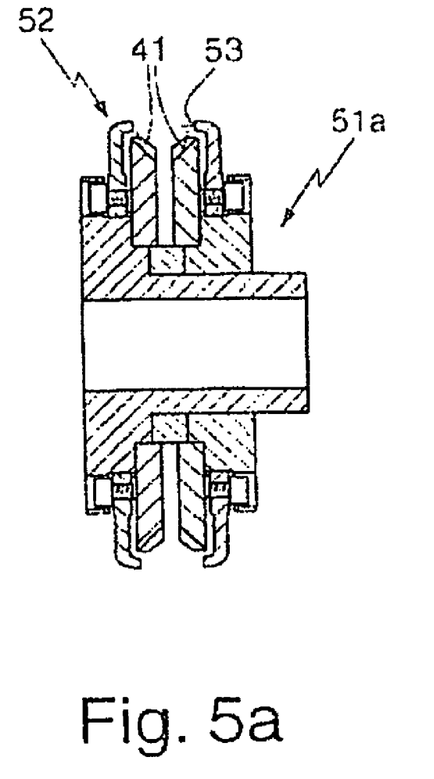
FIG. 5a shows a schematic cross-section of a chamfering disc with integrated cutting tool, which may be used in the method according to the invention.

FIG. 5a shows, in a schematic cross-sectional view, a chamfering disc 51a corresponding to the chamfering disc of FIG. 4a, but with an integrated cutting tool 52. The cutting tool 52 has cutting edges 53 which may be passed over the faces of a gear wheel to shave off axial projections of material (burrs or also deformation beads).

Figure 5B:
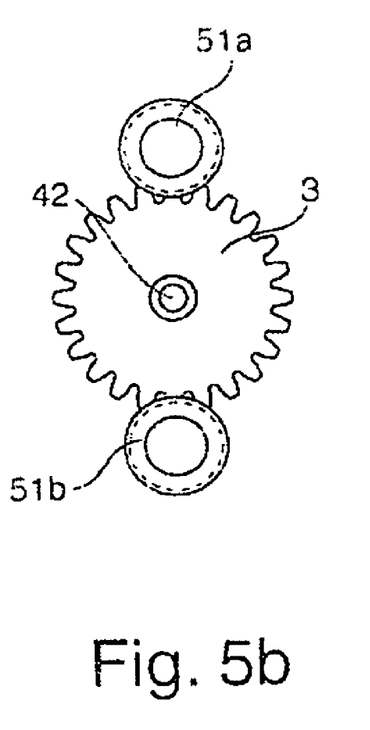
FIG. 5b shows a schematic plan view of a workpiece during chamfering with cutting edges, wherein two opposing chamfering discs with integrated cutting tool are used.

FIG. 5b shows in plan view the use of two chamfering discs 51a, 51b with integrated cutting tool at a workpiece 3. The chamfering discs 51a, 51b are positioned opposite each other relative to the chuck 42 to which the workpiece 3 is fastened, and are used with the same force. In that manner, moments applied to the workpiece 3 and its bearing are once again minimised.

To summarise, the invention relates to a method for tooth-machining of workpieces, especially gear wheels, comprising milling, deburring by hobbing and integrated secondary deburring. The method proceeds on a machine tool having two workpiece spindles which may exchange places. A workpiece is mounted on a first workpiece spindle, followed by the workpiece spindles exchanging places, followed by pre-milling and, where applicable, cutting (=deburring by shaving) of the workpiece, followed by a further exchange of places, followed by chamfering and cutting of the workpiece, followed by a further exchange of places, followed by a finish-milling of the workpiece, followed by a further exchange of places, followed by a workpiece change. At the same time, the same procedure takes place on the second workpiece spindle, staggered in time by an exchange of places of the workpiece spindles. With the method according to the invention, well-deburred toothed workpieces may be produced quickly and at low cost. In particular, milling and complete (=radial and axial) deburring may be carried out with only one workpiece-clamping operation. Milling on the one hand and deburring and workpiece changing on the other take place in parallel in a time-saving manner.

The invention claimed is:

1. Method for operating a machine tool (1) for tooth-machining of workpieces (3), wherein the machine tool (1) has a rotary holder (2) which is rotatable about a main axis (HA) and which has two workpiece spindles (11, 12) whose spindle axes extend parallel to the main axis (HA), wherein the spindle axes are each at the same distance from the main axis (HA), wherein the rotary holder (2) is rotatable into a first rotated position (VP1) in which the first workpiece spindle (11) is in a transfer position (TP) and the second workpiece spindle (12) is in a machining position (BP), and wherein the rotary holder (2) is rotatable into a second rotated position (VP2) in which the first workpiece spindle (11) is in the machining position (PB) and the second workpiece spindle (12) is in the transfer position (TP), characterised by the following steps:

a) the rotary holder (2) is brought into the first rotated position (VP1), at the first workpiece spindle (11), in the transfer position (TP), a finished part (FT) is unloaded and an unmachined part (RT) is loaded, and at the second workpiece spindle (12), in the machining position (BP), a semi-finished part (HFT) is produced from an unmachined part (RT) by pre-milling;

b) the rotary holder (2) is brought into the second rotated position (VP2), at the first workpiece spindle (11), in the machining position (BP), a semi-finished part (HFT) is produced from the unmachined part (RT) by pre-milling, and at the second workpiece spindle (12), in the transfer position (TP), a deburred chamfered semi-finished part (aHFT) is produced from the semi-finished part (HFT) by chamfering and cutting;

c) the rotary holder (2) is brought into the first rotated position (VP1), at the first workpiece spindle (11), in the transfer position (TP), a deburred chamfered semi-finished part (aHFT) is produced from the semi-finished part (HFT) by chamfering and cutting, and at the second workpiece spindle (12), in the machining position (BP), a finished part (FT) is produced from the deburred chamfered semi-finished part (aHFT) by fine-milling;

d) the rotary holder (2) is brought into the second rotated position (VP2), at the first workpiece spindle (11), in the machining position (BP), a finished part (FT) is produced from the deburred chamfered semi-finished part (aHFT) by fine-milling, and at the second workpiece spindle (12), in the transfer position (TP), the finished part (FT) is unloaded and an unmachined part (RT) is loaded;

wherein steps a) to d) are repeated at least once.

2. A method according to claim 1, characterised in that the main axis (HA) of the rotary holder (2) is oriented horizontally during the method steps a) to d).

3. A method according to either of the preceding claims, characterised in that the same tool (4) of the machine tool (1) is used for the pre-milling of unmachined parts (RT) and for the fine-milling of deburred chamfered semi-finished parts (aHFT) at the machining position (BP).

4. A method according to any one of the preceding claims, characterised in that, in steps b) and c), the chamfering of a semi-finished part (HFT) at the transfer position (TP) is carried out from two sides with force equalisation.

5. A method according to claim 4, characterised in that, in steps b) and c), two opposing chamfering discs (8a, 8b; 51a, 51b) are used for chamfering a semi-finished part (HFT) at the transfer position (TP).

6. A method according to claim 5, characterised in that that cutting tools (52) are integrated in the chamfering discs (51a, 51b), and the chamfering discs (51a, 51b) are used for chamfering and cutting.

7. A method according to any one of claims 1 to 5, characterised in that, in steps b) and c), the chamfering and the cutting of a semi-finished part (HFT) at the transfer position (TP) are each performed with separate tools (8a, 8b; 10).

8. A method according to any one of claims 1 to 3, characterised in that, in steps b) and c), the chamfering of a semi-finished part (HFT) at the transfer position (TP) is performed from a first side and the cutting of the semi-finished part (HFT) at the transfer position (TP) is performed from a second side which is opposite the first side, with separate, opposing tools (8a, 10).

9. A method according to any one of the preceding claims, characterised in that, in steps a) and b), during or after pre-milling of an unmachined part (RT) at the machining position (BP), cutting is also performed.

* * * * *